United States Patent
Aprile

(10) Patent No.: US 6,237,998 B1
(45) Date of Patent: May 29, 2001

(54) BABY SEAT COVER

(76) Inventor: Sandra Stephens Aprile, 1457 2$^{nd}$ St., Manhattan Beach, CA (US) 90266

( * ) Notice: Subject to any disclaimer, the term of this patent is extended or adjusted under 35 U.S.C. 154(b) by 0 days.

(21) Appl. No.: 09/252,531

(22) Filed: Feb. 17, 1999

(51) Int. Cl.$^7$ .................................................. A47C 31/00
(52) U.S. Cl. ............................... 297/219.12; 297/256.17; 297/423.1
(58) Field of Search ............................ 297/250.1, 256.17, 297/256.15, 188.01, 188.13, 188.2, DIG. 6, 129, 118, 423.1, 219.12, 219.1

(56) References Cited

U.S. PATENT DOCUMENTS

| | | |
|---|---|---|
| 1,538,538 | 5/1925 | Wood . |
| 2,652,183 | 9/1953 | Hlivka . |
| 2,655,982 * | 10/1953 | Christensen . |
| 2,797,743 | 7/1957 | Rodtz, Jr. . |
| 3,580,633 * | 5/1971 | Du Priest . |
| 4,108,489 | 8/1978 | Salzman . |
| 4,204,695 | 5/1980 | Salzman . |
| 4,324,430 | 4/1982 | Dimas, Jr. et al. . |
| 4,540,219 | 9/1985 | Klinger . |
| 4,630,863 | 12/1986 | Roberts . |
| 4,655,502 | 4/1987 | Houllis . |
| 5,161,275 | 11/1992 | Simpson et al. . |
| 5,238,293 | 8/1993 | Gibson . |
| 5,547,250 * | 8/1996 | Childers . |
| 5,678,888 * | 10/1997 | Sowell et al. . |
| 5,791,732 * | 8/1998 | Lucree . |
| 5,842,741 * | 12/1998 | Onorini . |
| 5,897,165 * | 4/1999 | Kucharczyk et al. . |

* cited by examiner

Primary Examiner—Milton Nelson, Jr.

(57) ABSTRACT

A shopping cart seat cover has a shopping cart seat cover body made from flexible sheet material. The seat cover has a front panel, a handle fold at the upper portion of the front panel, and an interior seat liner panel extending from the front panel at the handle fold. The interior seat liner panel has right and left child leg apertures in the front portion of the interior seat liner panel, a rear seat basket fold at the back of the interior panel, and a rear flap extending from the interior panel at the rear seat basket fold. The interior panel includes a plurality of aperture closure flaps extending across a left leg aperture and a plurality of aperture closure flaps extending across a right leg aperture of the interior panel. The interior panel further includes right and left shopping cart side rail cover flaps. The shopping cart seat cover includes left and right side shopping cart handle covers. A safety strap extends through the right and left safety flap apertures of the rear flap. The safety strap has a clasp located in between the interior panel and the rear flap. A child foot shield storage pouch extends downwardly from the front panel. The storage pouch has an interior volume that is sufficiently large to accommodate the shopping cart seat cover body.

18 Claims, 3 Drawing Sheets

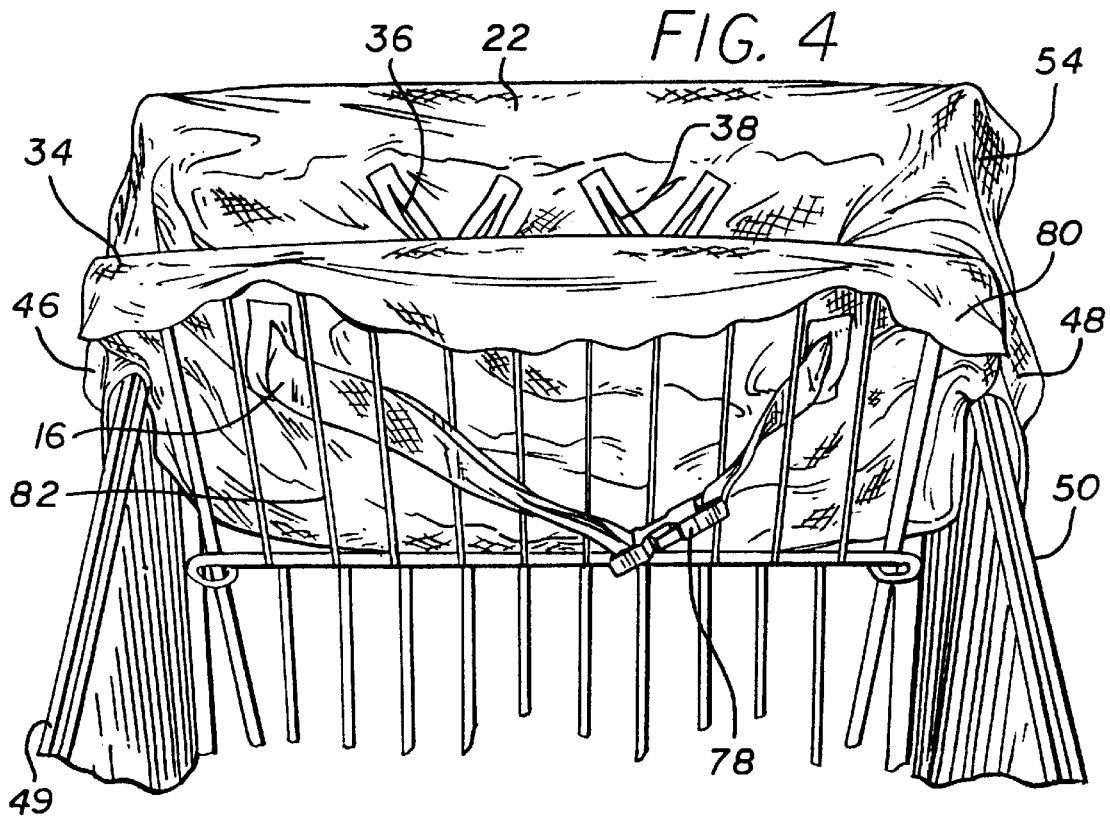
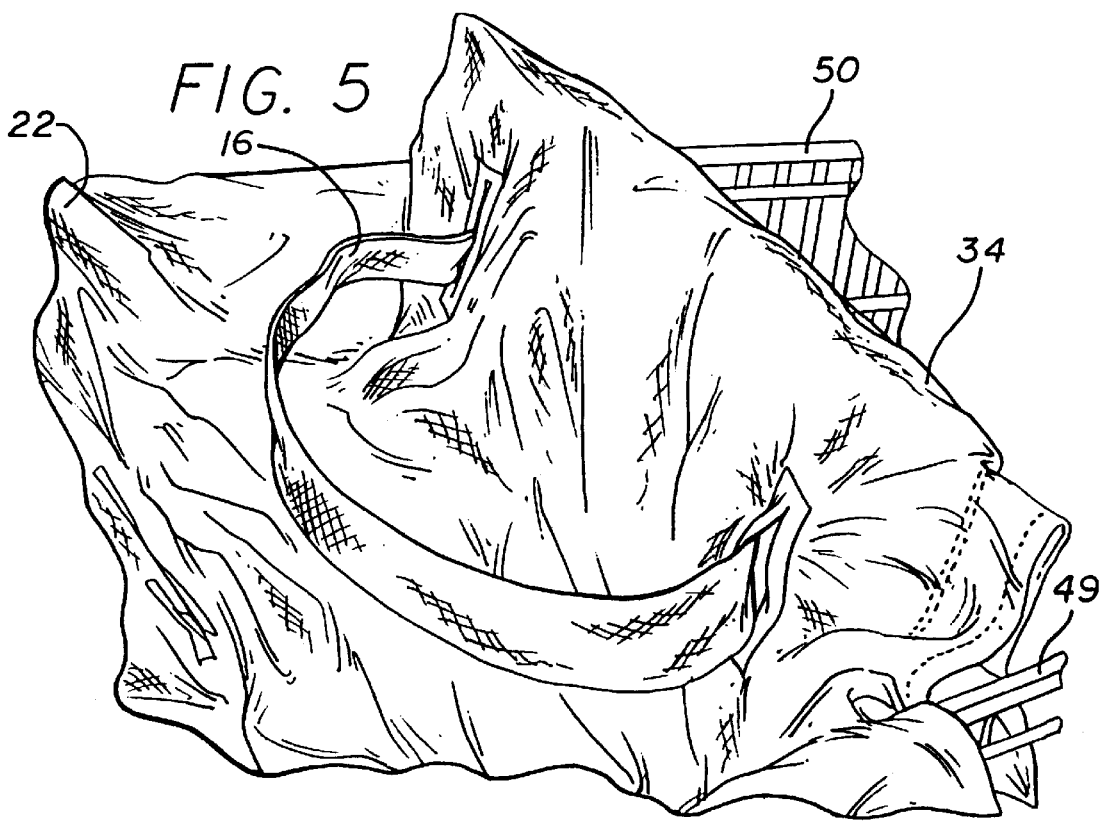

BABY SEAT COVER

I. BACKGROUND OF THE INVENTION a. Field of the Invention

The present invention relates in general to seat covers and, in particular, to covers for shopping cart basket seats for children.

b. Prior Art

Most supermarkets and a variety of other stores provide customers with shopping carts. The typical shopping cart has a folding child seat in which a young child can sit as the cart is pushed through the store. Although ubiquitous, these seats leave much to be desired.

One problem is that a great many people use the shopping cart. Microorganisms abound on the handle of the cart and on various other exposed cart surfaces. Microorganisms and other contaminants pass from the exposed surfaces to the child, who is often touching and in some cases chewing on the exposed surfaces. Prior art devices such as U.S. Pat. Nos. 4,204,695, 4,323,430 and 4,655,502 all disclose supplements for use in shopping cart child seats, but all of these devices leave portions of the cart exposed and within the reach of the child.

U.S. Pat. Nos. 4,655,502 and 5,238,293 disclose a shopping cart cushion and seat cover, respectively. Each device has leg holes through which the child's legs extend. However, in both cases the leg holes are open. The child can reach through the holes with his or her hand and touch exposed surfaces of the cart. In both devices, the child may pull his or her feet up, touch them with their hands, and sometimes even put one of their feet up to their mouth. As shoes are usually dirty, it would be desirable to prevent the child from touching their dirty shoes while sitting in the shopping cart.

Another problem is that the child is left unsecured within the seat. Many children are injured each year from falling out of or against the child seat. U.S. Pat. Nos. 4,204,695 and 4,655,502 propose a restraining strap that extends through the backrest of the child seat and around the child. In both arrangements, however, there is a buckle in the front of the strap that rests adjacent to the child's stomach. If the buckle is tightened sufficiently to restrain the child, the buckle digs into the child's skin, making the child uncomfortable and sometimes leaving a mark on the skin.

An active child can also disengage the buckle, rendering the restraining strap useless. Even if the strap were to be reoriented so that buckle is behind the back support of the seat, the child could reach behind the seat and unlatch the buckle.

An additional problem relates to storage of seat covers when not in use. U.S. Pat. No. 5,238,293 proposes rolling up the seat cover when not in use, and then securing a strap about the rolled-up seat cover. Under this arrangement, a significant portion of the seat is exposed during storage. The seat cover can gather dust, get dirty, or otherwise become unsanitary during storage.

II. SUMMARY OF THE INVENTION

The present invention seeks to overcome deficiencies in the prior art. The invention relates to a child seat cover that prevents the child from touching exposed surfaces of the seat. The seat cover protects the child from coming into contact with the various microorganisms, dirt and other contamination on the surface of the seat itself.

In accordance with one aspect of the invention, a shopping cart seat cover for a child's shopping cart seat includes means for preventing the child from touching the surface of the shopping cart. The seat cover may also include additional features, such as means for preventing the child from touching the child's own feet, means for storing the seat cover when not in use, means for retaining the child within the seat, and/or means for preventing the child from disengaging the means for retaining the child within the seat.

In one of many ways to embody the invention, a shopping cart seat cover has a shopping cart seat cover body made from flexible sheet material. The seat cover body has a front panel having an upper portion and a lower portion. There is a handle fold at the upper portion of the front panel, and an interior seat liner panel extending from the front panel at the handle fold. The interior seat liner panel has a front and a back, and right and left child leg apertures in the front portion of the interior seat liner panel. There is a rear seat basket fold at the back of the interior panel, and a rear flap extending from the interior panel at the rear seat basket fold. The rear flap has right and left safety strap apertures. The interior panel includes a plurality of aperture closure flaps extending across the left leg aperture and a plurality of aperture closure flaps extending across the right leg aperture of the interior panel. The interior panel also has right and left shopping cart side rail cover flaps. The shopping cart seat cover includes left and right side shopping cart handle covers. The seat cover also has a safety strap with a clasp, and the safety strap extends through the right and left safety flap apertures of the rear panel, the clasp located in between the interior panel and the rear flap (so that even if the child reaches back behind the seat, he or she cannot grab ahold of the clasp). A child foot shield storage pouch extends downwardly from the front panel, the storage pouch having an interior volume sufficiently large to accommodate the shopping cart seat cover body.

Alternative embodiments may include more or fewer features than described in the previous paragraph. One additional feature is that the left and right shopping cart side rail cover flaps are each formed by sewing a respective portion of the front panel to a respective portion of the interior panel to form a structure that is substantially closed on the front, right and left sides of the front portion of the shopping cart seat cover body. The seat cover is adapted to completely cover the front and sides of a shopping cart child's seat. The shopping cart seat cover may be made of a variety of different materials, but one preferred embodiment employs single-ply sail material.

In a particular embodiment, the storage pouch includes a closure. The seat cover has a first mode in which the seat cover body is adapted to be placed on a child seat of the shopping cart, and a second mode in which the seat cover body is secured within the storage pouch. The closure serves to secure the storage pouch shut in the second mode. In a particular embodiment, in the first mode, the front panel and child foot shield storage pouch together extend downwardly from the handle fold a distance of at least 16 inches to prevent a child from reaching over the handle of the shopping cart and touching his or her feet. Similarly, in one embodiment, in the first mode, the rear panel extends downwardly from the rear seat basket fold a distance of at least 8 inches. The child is thus prevented from reaching behind the seat and grabbing the safety strap.

This has been a brief summary of some of the major points of the invention. However, there are various other aspects of the invention, as will become apparent from studying the drawings, the Detailed Description that follows, and the claims.

III. BRIEF DESCRIPTION OF THE DRAWINGS

FIG. 4 is a side perspective view illustrating the safety strap;

FIG. 5 is a front view of the child seat cover as it appears fully extended.

IV. DETAILED DESCRIPTION OF THE PREFERRED EMBODIMENT

Figure 1:
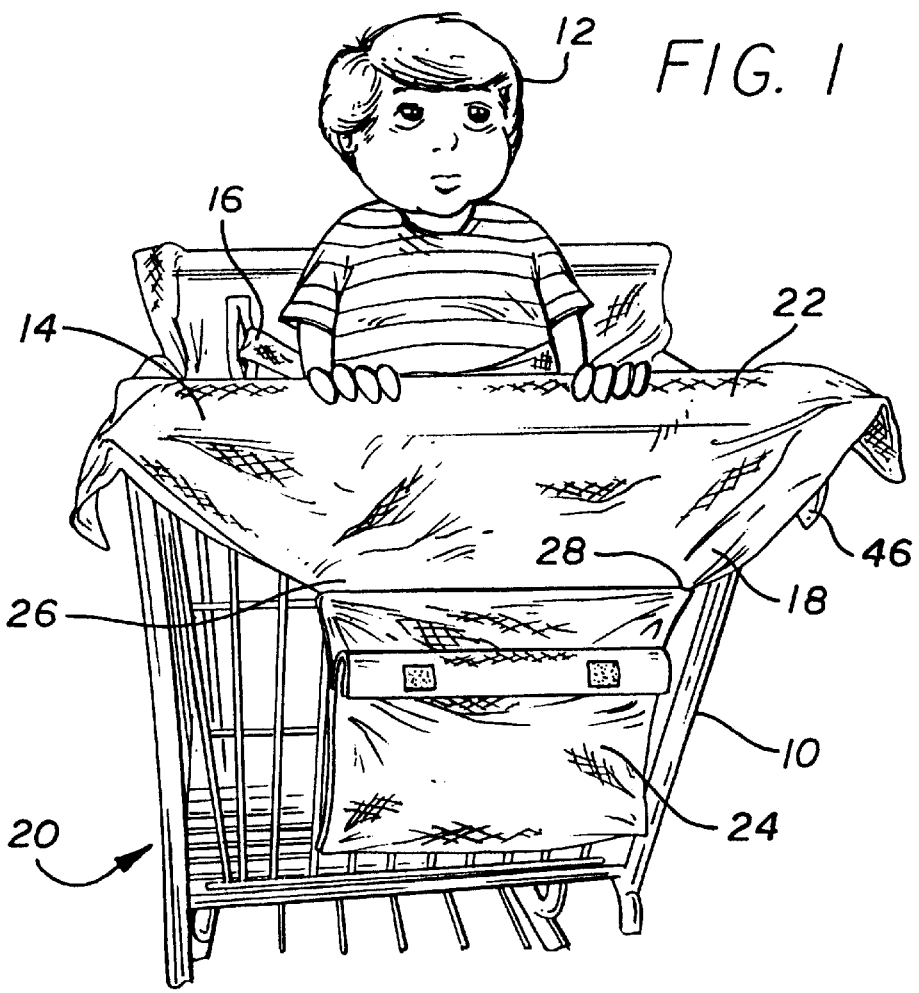
FIG. 1 is a front perspective view of an embodiment of an improved child seat cover as installed on a shopping cart basket.

Referring to FIG. 1, one embodiment of the present invention is installed in a child's seat on a standard shopping cart 10 of the type typically found in grocery stores and the like. A child 12 seats in the child seat basket facing the handle 14. Safety strap 16 secures the child 12 into the child's seat. A front panel 18 extends downwardly along the rear face 20 of the shopping cart 10. The front panel 18 extends downwardly from the handle fold 22 and terminates at the top of the storage pouch 24 which is sewn on a bottom edge area 26 of the front panel 18. A seam 28 extends across the front panel 18 where the storage pouch 24 has been sewn onto the front panel 18. Because the storage pouch 24 extends downwardly below the child's shoes (not shown), the storage pouch can be referred to as a child foot shield storage pouch. The storage pouch 24 covers the child's shoes so that the child cannot reach over the handle 14 and touch his or her shoes, which are typically very dirty and unsanitary.

Figure 2:
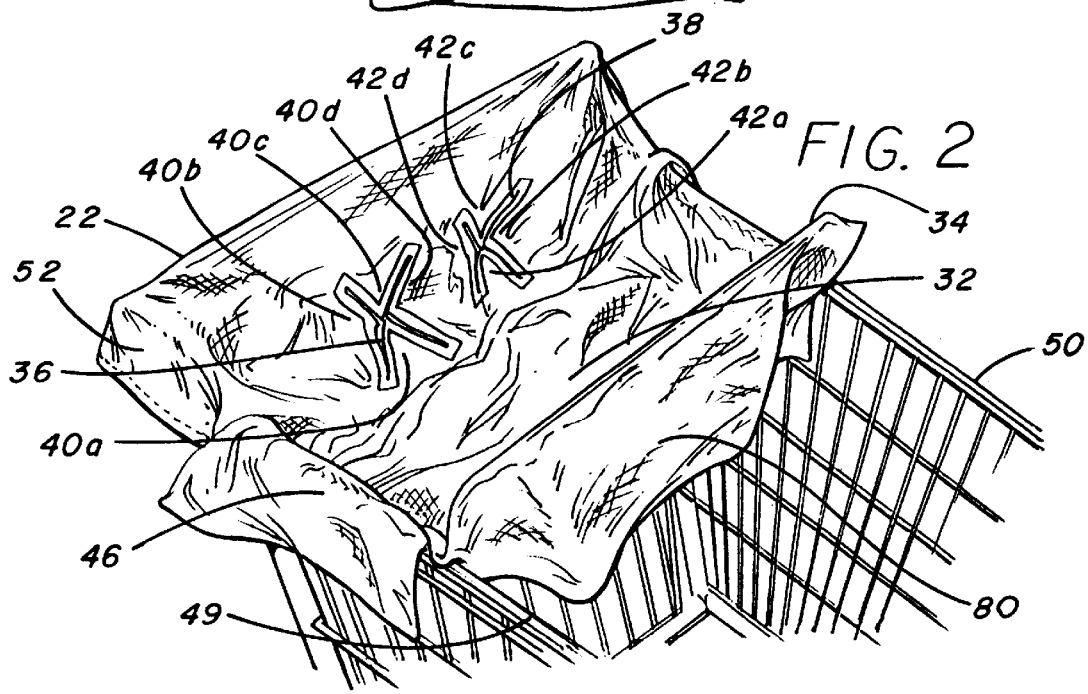
FIG. 2 is a rear side perspective view of the embodiment of FIG. 1.

Referring now to FIG. 2, the interior of the basket is covered with interior panel 32, which extends from the handle fold 22 to the rear rail fold 34. In the front part of the interior panel 32, there are leg apertures 36 and 38 through which a child may extend his or her legs. The leg apertures 36 and 38 align with openings in the shopping cart basket through which the child may extend his or her legs. The leg apertures 36 and 38 are illustrated as X-shape slits cut in the material, forming leg aperture flaps 40A–D and 42A–D. When the child puts his or her legs through the respective leg apertures 36 and 38, the leg aperture flaps remain adjacent to the child's legs. The respective apertures open just wide enough to accommodate the child's legs. The child is then hindered from reaching through the apertures to touch his or her feet or shoes, which are typically quite dirty. In this way, the leg aperture flaps, 40A–D and 42A–D assist in keeping the child from coming into contact with his or her dirty feet or shoes and thereby serving to keep the child clean.

Extending from the interior panel 32 on the right and left sides are respective right and left side flaps 46 and 48. The side flaps extend over the respective side rails 49 and 50 and hang downwardly therefrom. Because the side flaps 46 and 48 flap over the side rails and hang down, the child is thereby unable to touch either side of the shopping cart. The child is thereby protected from any germs or contamination that may be on the side of the shopping cart.

Figure 3:
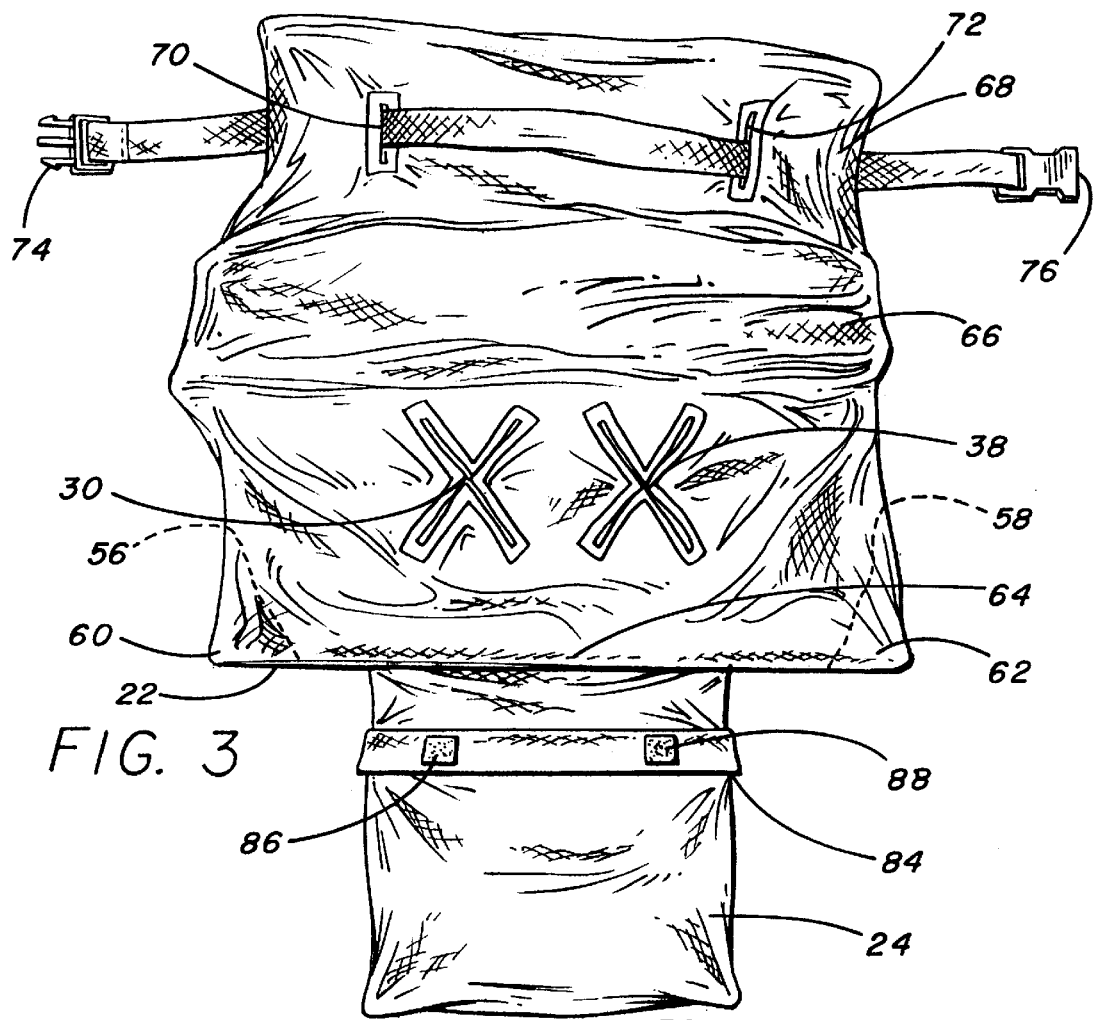
FIG. 3 is a rear perspective view with the rear flap cut away to reveal the safety strap and clasp that is normally beneath the rear flap.

Similarly, the seat cover is provided with right and left front side flaps 52 and 54 (not shown), which serve to prevent the child from touching the right and left sides, respectively, of the handle of the cart. The front side flap 52 and 54 may be constructed by sewing respective portions of the front panel 18 to respective portions of the interior panel 32. A structure on the front is thereby created which is substantially close on the front right and left sides of the front portion of the shopping cart seat cover body. The seat cover is thereby adopted to completely cover the front and sides of the shopping cart handle. Referring now to FIG. 3, the front panel 18 is sewn along seam lines 56 and 58 in order to create the structure that is substantially close to the front, right and left sides of the front portion of the shopping cart seat cover body. The seamlines 56 and 58 create corner ears 60 and 62, which flap forwardly and downwardly along the sides of the shopping cart handle when the seat cover is installed on the shopping cart seats. These corner ears 60 and 62 provides further sanitary protection for the child.

FIG. 3 illustrates that the interior panel 32 includes a front portion 64, a bottom portion 66 and a rear portion 68 of the interior panel. The safety strap 16 extends through apertures 70 and 72 in the rear portion 68 of the interior panel. The safety strap 16 is secured with a clasp that comprises clasp prongs 74 and a clasp receptor 76. As FIG. 5 illustrates, the safety strap 16 extends in front of the child. A clasp 78 is positioned behind the child seat FIG. 4 and is covered by the rear flap 80 (FIG. 2). In FIG. 4, the rear flap 80 is shown cut away simply to illustrate that the clasp 78 on the safety strap 16 extends behind the child and to the rear of the rear wall of the child's seat. With the rear flap 80 covering the safety strap at 16 and the clasp 78, such that the clasp 78 is located in between the interior panel 32 and the rear flap 80, a child cannot reach behind him or herself and unclasp the safety strap. This is a safety feature that is particularly useful in retaining the child in the child's seat.

Figure 6:
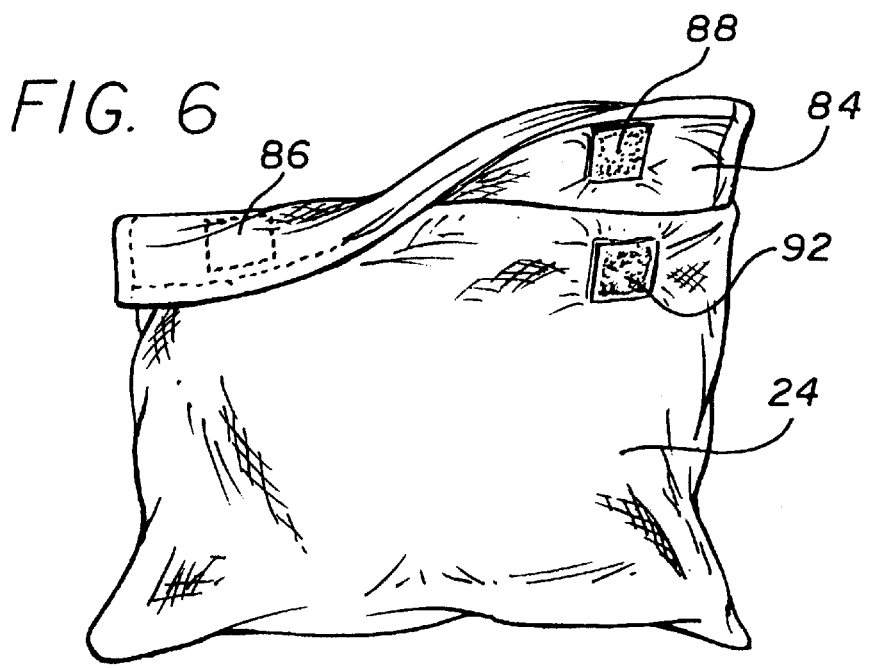
FIG. 6 illustrates the child seat cover rolled up and tucked into the storage pouch.

The preferred embodiment of the present invention is provided with a handy storage pouch 24 that serves a double function. Its first function is to serve as means for storing the seat cover when not in use. The pouch 24 has an interior space which is sufficiently large to accommodate the rest of the cover seat. Typically, the cover seat will be rolled up and placed inside the pouch 24. A flap 84 has Velcro® tabs 86 and 88. Matching Velcro® tabs (not shown) are situated on the back of the pouch 24. After the shopping cart seat cover body has been rolled up and inserted into pouch 24, a flap 84 is folded over to the opposite side of the pouch 24 where the Velcro® tab 86 and 88 interconnect with mating Velcro® tabs on the opposite side of pouch 24 to seal the pouch shut. The pouch 24 then serves to protect the shopping cart seat cover body from dust and other contamination. FIG. 6 illustrates the pouch 24 with the shopping cart seat cover body having been rolled up and inserted into the pouch 24. The Velcro® tab 88 is shown immediately prior to being interconnected with mating Velcro® tab 92, Velcro® tab 86 having been adhered to a corresponding Velcro® tab.

By way of materials, the seat cover is typically made from single-ply sail material that is durable yet soft. One suitable material is available from Glen Raven Mills, Inc. of Glen Raven, N.C., under the tradename SUNBRELLA®. The material is a 9.25 oz solution dyed breathable woven fabric made of 100% acrylic fiber.

By way of example dimensions, but not by way of limitation, in one embodiment the pouch 24 is 12 inches wide by 10½ inches high, as measured from the seam between the pouch 24 and the interior panel 32. The rear flap 80 is 22 inches wide by 7½ inches high. The rear portion 68 is 22 inches wide at the rear rail fold 34 and is 10 inches high. Each of the leg apertures 26 are formed with an "x" having a length of 5½ inches as measured from tip-to-tip on each leg of the "x", "\" and "/". Each "x" is approximately 3½ inches wide a the base and 5 inches tall. The side flaps 46 are 11½ inches wide at their outermost edge, and hang down over the side at a distance of approximately 4½ inches.

While a presently preferred embodiment of the present invention has been defined, it should be understood that various changes may be made to the system within the scope of the invention. For example, the seat cover may be adopted for use in other types of seats, such as high chairs, wheel chairs, and so on. The shopping cart seat cover body may be made from other flexible sheets other than sail material, including natural and synthetic fabrics. The seat may also be made out of a cushion material in order to provide additional support to the child. The seat may alternatively be made by double thickness, air tight material that can be inflated for particular cushion comfort. The clasp 78 need not necessarily be a prong and receptor type clasp, but may alternatively hook and loop material type arrangement, a belt and buckle type arrangements, a snap arrangement, or any other of various belt connecting mechanisms known in the art. Consequently, the present invention is not limited to the detailed description of a preferred embodiment presented above.

What is claimed is:

1. A shopping cart seat cover comprising:

a shopping cart seat cover body made from flexible sheet material comprising a front panel having an upper portion and a lower portion, a handle fold at the upper portion of the front panel, an interior seat liner panel extending from said front panel at said handle fold, the interior seat liner panel having a front portion and a back portion, and right and left child leg apertures in the front portion of the interior seat liner panel, a rear seat basket fold at the back portion of the interior panel, and a rear flap extending from the interior panel at said rear seat basket fold, said rear flap having right and left safety strap apertures;

said interior panel including a plurality of aperture closure flaps extending across the left leg aperture and a plurality of aperture closure flaps extending across the right leg aperture of the interior panel;

said interior panel further including right and left shopping cart side rail cover flaps;

said shopping cart seat cover including left and right side shopping cart handle covers;

a safety strap with a clasp, said safety strap extending through the right and left safety strap apertures of the rear flap, said clasp located in between said interior panel and said rear flap; and a child foot shield storage pouch extending downwardly from said front panel, said storage pouch having an interior volume sufficiently large to accommodate said shopping cart seat cover body.

2. A shopping cart seat cover as defined in claim 1 in which said left and right shopping cart side rail cover flaps each comprise a respective portion of the front panel sewn to a respective portion of the interior panel to form a structure that is substantially closed on the front, right and left sides of the front portion of the shopping cart seat cover body, wherein the seat cover is adapted to completely cover the front and sides of a shopping cart child's seat.

3. A shopping cart seat cover as defined in claim 1 wherein the seat cover body is made of a single-ply sail material.

4. A shopping cart seat cover as defined in claim 1 wherein the storage pouch includes a closure, said seat cover having a first mode in which the seat cover body is adapted to be placed on a child seat of a shopping cart, and a second mode in which the seat cover body is secured within the storage pouch, said closure securing said storage pouch shut in said second mode.

5. A shopping cart seat cover as defined in claim 4 wherein in said first mode, the front panel and child foot shield storage pouch together extend downwardly from the handle fold a distance of at least 16 inches.

6. A shopping cart seat cover as defined in claim 4 wherein in said first mode, the rear panel extends downwardly from the rear seat basket fold a distance of at least 8 inches.

7. A shopping cart seat cover comprising:

a shopping cart seat cover body made from flexible sheet material comprising a front panel having an upper portion and a lower portion, a handle fold at the upper portion of the front panel, an interior seat liner panel extending from said front panel at said handle fold, the interior seat liner panel having a front portion and a back portion, and right and left child leg apertures in the front portion of the interior seat liner panel, a rear seat basket fold at the back portion of the interior panel, and a rear flap extending from the interior panel at said rear seat basket fold, said rear flap having right and left safety strap apertures;

said interior panel including a plurality of aperture closure flaps extending across the left leg aperture and a plurality of aperture closure flaps extending across the right leg aperture of the interior panel;

said interior panel further including right and left shopping cart side rail cover flaps;

said shopping cart seat cover including left and right side shopping cart handle covers; and a child foot shield storage pouch extending downwardly from said front panel, said storage pouch having an interior volume sufficiently large to accommodate said shopping cart seat cover body.

8. A shopping cart seat cover as defined in claim 7 further comprising a safety strap with a clasp, said safety strap extending through the right and left safety strap apertures of the rear flap, said clasp located in between said interior panel and said rear flap.

9. A shopping cart seat cover as defined in claim 7 in which said shopping cart seat cover body is made of a single ply sail material.

10. A shopping cart seat cover as defined in claim 7 in which said left and right shopping cart side rail cover flaps each comprise a respective portion of the front panel sewn to a respective portion of the interior panel to form a structure that is substantially closed on the front, right and left sides of the front portion of the shopping cart seat cover body, wherein the seat cover is adapted to completely cover the front and sides of a shopping cart child's seat.

11. A shopping cart seat cover as defined in claim 7, said seat cover having a first mode in which the seat cover body is adapted to be placed on a child seat of a shopping cart, and a second mode in which the seat cover body is secured within the storage pouch, a closure securing said storage pouch shut in said second mode.

12. A shopping cart seat cover as defined in claim 11 wherein in said first mode, a rear panel extends downwardly from the rear seat basket fold a distance of at least 8 inches.

13. A shopping cart seat cover as defined in claim 11 wherein in said first mode, the front panel and child foot shield storage pouch together extend downwardly from the handle fold a distance of at least 16 inches.

14. A shopping cart seat cover for a shopping cart child's seat comprising:

a shopping cart seat cover body made from flexible sheet material comprising a front panel having an upper portion and a lower portion, a handle fold at the upper portion of the front panel, an interior seat liner panel extending from said front panel at said handle fold, the interior seat liner panel having a front portion and a back portion, and right and left child leg apertures in the front portion of the interior seat liner panel, a rear seat basket fold at the back portion of the interior panel, and a rear flap extending from the interior panel at said rear seat basket fold, said rear flap having right and left safety strap apertures;

said interior panel including a plurality of aperture closure flaps extending across the left leg aperture and a plurality of aperture closure flaps extending across the right leg aperture of the interior panel;

said interior panel further including right and left shopping cart side rail cover flaps;

a safety strap with a clasp, said safety strap extending through the right and left safety strap apertures of the rear flap, said clasp located in between said interior panel and said rear flap;

a child foot shield storage pouch extending downwardly from said front panel, said storage pouch having an interior volume sufficiently large to accommodate said shopping cart seat cover body;

said left and right shopping cart side rail cover flaps each comprising a respective portion of the front panel sewn to a respective portion of the interior panel to form a structure that is substantially closed on the front, right and left sides of the front portion of the shopping cart seat cover body, wherein the seat cover is adapted to completely cover the front and sides of a shopping cart child's seat;

said seat cover body being made of a single-ply sail material;

said storage pouch including a closure, said seat cover having a first mode in which the seat cover body is adapted to be placed on a child seat of a shopping cart, and a second mode in which the seat cover body is secured within the storage pouch, said closure securing said storage pouch shut in said second mode;

wherein in said first mode, the front panel and child foot shield storage pouch together extend downwardly from the handle fold a distance of at least 16 inches; and wherein in said first mode, a rear panel extends downwardly from the rear seat basket fold a distance of at least 8 inches.

15. A shopping cart seat cover for a child's shopping cart seat, the seat cover serving to protect a child sitting in the seat from touching the exposed surfaces of the shopping cart and the child's own feet, the shopping cart having a handle, comprising:

means for preventing the child from touching the surface of the shopping cart;

means for preventing the child from touching the child's own feet, comprising a foot shield that is adapted to hang downwardly from the handle of the shopping cart.

16. A seat cover as defined in claim 15 further comprising means for storing the seat cover when not in use.

17. A seat cover as defined in claim 15 further comprising means for retaining the child within the seat.

18. A seat cover as defined in claim 17 further comprising means for preventing the child from disengaging the means for retaining the child within the seat.

* * * * *